United States Patent
Wang et al.

(10) Patent No.: US 8,104,144 B2
(45) Date of Patent: Jan. 31, 2012

(54) HINGE ASSEMBLY AND ELECTRONIC DEVICE USING THE SAME

(75) Inventors: Jin-Xin Wang, Shenzhen (CN); Han-Zheng Zhang, Shenzhen (CN); Shen Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 203 days.

(21) Appl. No.: 12/712,432

(22) Filed: Feb. 25, 2010

(65) Prior Publication Data

US 2011/0157780 A1  Jun. 30, 2011

(30) Foreign Application Priority Data

Dec. 25, 2009  (CN) .......................... 2009 1 0312302

(51) Int. Cl.
  *E05D 7/00* (2006.01)
(52) U.S. Cl. ....................................................... 16/354
(58) Field of Classification Search .................. 16/354, 16/366, 365, 368, 369, 370; 361/679.08, 361/679.11, 679.02, 679.15, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 3,163,883 | A * | 1/1965 | Olsson ........................... | 16/354 |
| 6,505,381 | B1 * | 1/2003 | Thomson et al. ............... | 16/302 |
| 6,519,812 | B2 * | 2/2003 | Ko et al. ......................... | 16/354 |
| 2006/0238970 | A1 * | 10/2006 | Ukonaho et al. ............. | 361/683 |
| 2007/0084016 | A1 * | 4/2007 | Bommelmann et al. ........ | 16/366 |
| 2007/0226955 | A1 * | 10/2007 | Cho et al. ........................ | 16/354 |
| 2008/0216288 | A1 * | 9/2008 | Hoffman ......................... | 16/354 |
| 2010/0024169 | A1 * | 2/2010 | Self ................................. | 16/354 |
| 2010/0149764 | A1 * | 6/2010 | Ueyama ....................... | 361/749 |

FOREIGN PATENT DOCUMENTS

EP  1151970 A2 * 11/2001
JP  04089984 A * 3/1992

* cited by examiner

*Primary Examiner* — Chuck Y. Mah
(74) *Attorney, Agent, or Firm* — Altis Law Group, Inc.

(57) ABSTRACT

A hinge assembly includes a first pivot shaft, a second pivot shaft, a third pivot shaft, a first bracket, a second bracket, a first meshing wheel, a second meshing wheel, a third meshing wheel, and a transmission belt member sleeved on both the first meshing wheel and the third meshing wheel. The first pivot shaft, the second pivot shaft, and the third pivot shaft are substantially parallel. The first and second brackets are non-rotatably sleeved on the first and second pivot shafts, respectively. The third meshing wheel is disposed between the first meshing wheel and the second meshing wheel, and meshes with the second meshing wheel and the transmission belt member. An electronic device using the hinge assembly is also provided.

16 Claims, 4 Drawing Sheets

HINGE ASSEMBLY AND ELECTRONIC DEVICE USING THE SAME

BACKGROUND

1. Technical Field

The present disclosure generally relates to hinges, and more particularly to a hinge assembly applied in an electronic device.

2. Description of Related Art

Many electronic devices include hinged elements. To ensure that one part is capable of rotating relative to the other, a hinge assembly applied in an electronic device often includes a first bracket, a second bracket, four pivot shafts, two main gears, and two transmission gears. Two of the pivot shafts are received in the first bracket and the second bracket respectively and the main gears are non-rotatably sleeved on these pivot shafts, respectively. The transmission gears are positioned between the main gears and sleeved on the other two pivot shafts. One transmission gear meshes with the other transmission gear and one main gear simultaneously.

In use, the first bracket is rotated, and it rotates one of the main gears correspondingly. Thereby, the second bracket is rotated by the other main gear simultaneously with the main gear. Since the meshing gears rotate in reverse directions, when the main gears and the transmission gears rotate, the first bracket and the second bracket rotate in opposite directions. Thereby, two hinged elements of an electronic device using the hinge assembly may be opened or closed at double-speed.

However, since each of the two transmission gears meshes with one main gear and one transmission gear simultaneously, and each of the transmission gears and the main gears are sleeved on one pivot shaft, the transmission gears and the main gears must be assembled to mesh accurately to avoid choking of the gears.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The present hinge assembly may be applied in any electronic device with two or more hinged parts, such as notebook computers, LCD monitors, DVD (digital video disk) players, and others. Hereinafter, for the purposes of conveniently describing an exemplary application, the hinge assembly described and illustrated is applied in a notebook computer.

Figure 1:
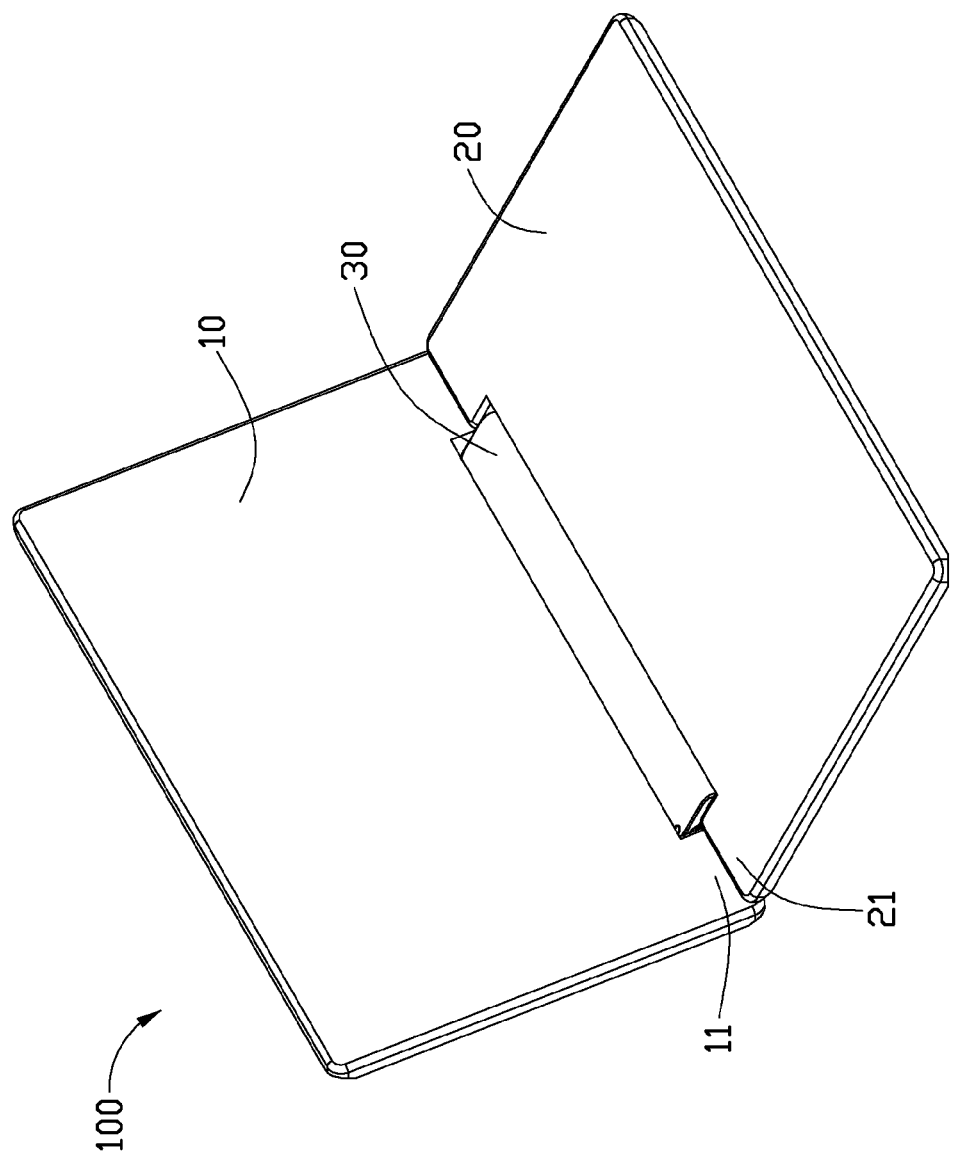
FIG. 1 is an assembled, isometric view of one embodiment of an electronic device including a hinge assembly.
Figure 2:
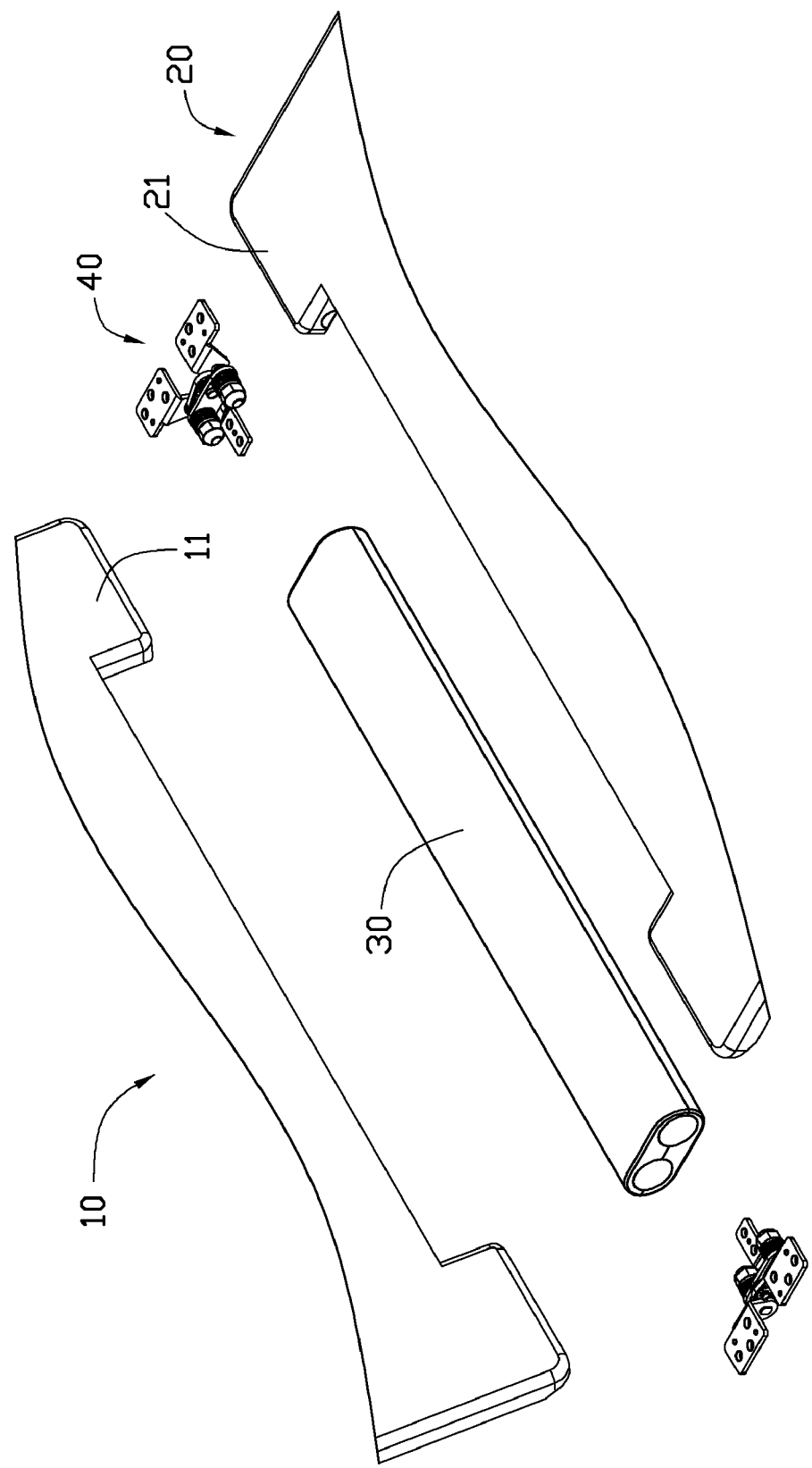
FIG. 2 is a partially exploded, isometric view of the electronic device of FIG. 1.

Referring to FIGS. 1 and 2, an electronic device 100 includes a first main body 10, a second main body 20, a connecting arm 30, and two hinge assemblies 40 connecting the first main body 10 and the second main body 20. In the illustrated embodiment, the first main body 10 is the top of the notebook computer, and the second main body 20 is the bottom.

The first main body 10 forms two first connecting protrusions 11 at the same side of the first main body 10 and in a manner to leave a space therebetween. The second main body 20 forms two second connecting protrusions 21 correspondingly, and the two second connecting protrusions 21 are formed at the same side of the second main body 20 and in a manner to leave a space therebetween.

The connecting arm 30 is an elongated hollow body which is not longer than either the distance between two first connecting protrusions 11 or the distance between two second connecting protrusions 21.

Figure 3:
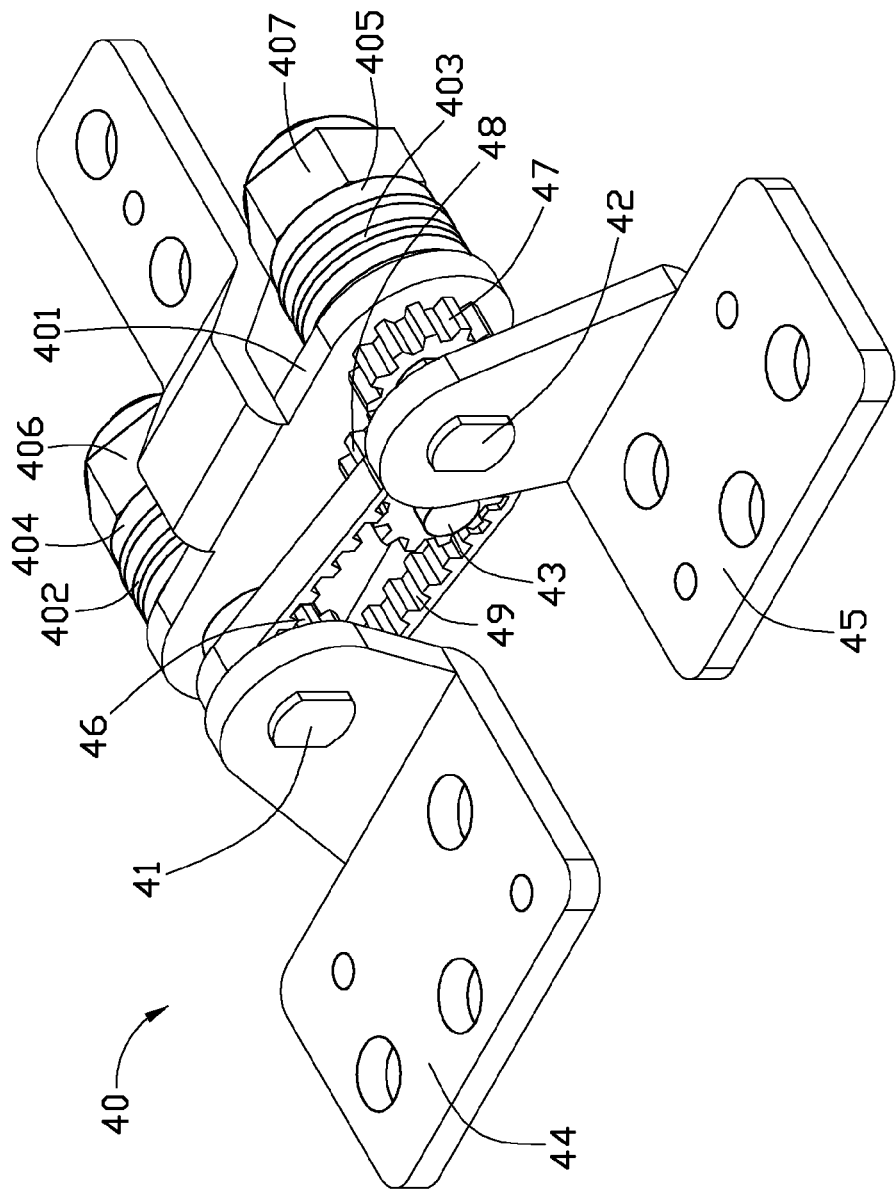
FIG. 3 is an assembled, isometric view of a hinge assembly utilized in an electronic device, such as, for example, that of FIG. 1.
Figure 4:
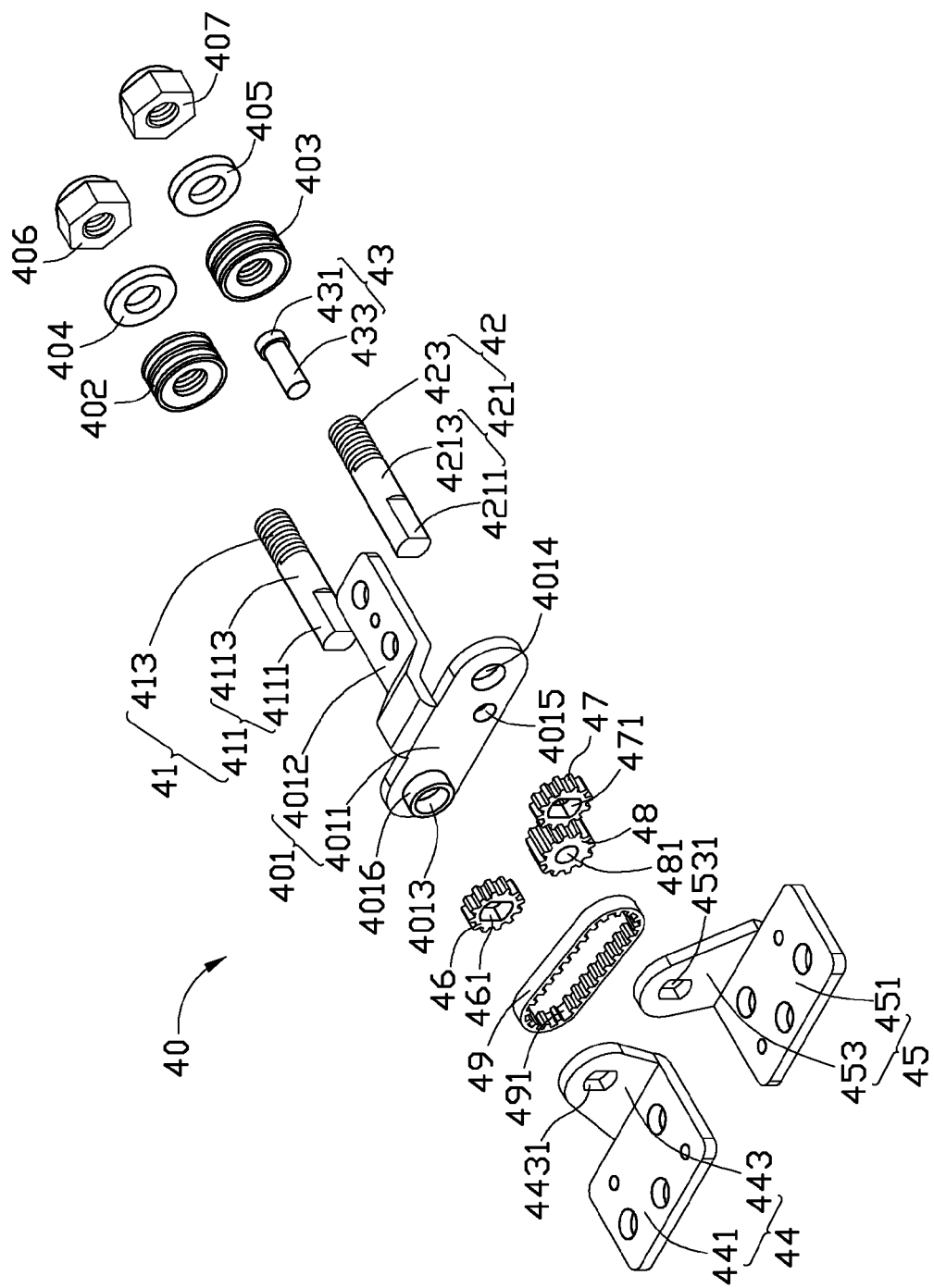
FIG. 4 is an exploded, isometric view of the hinge assembly of FIG. 3.

Referring to FIGS. 3 and 4, a hinge assembly 40 includes a first pivot shaft 41, a second pivot shaft 42, a third pivot shaft 43, a first bracket 44, a second bracket 45, a first meshing wheel 46, a second meshing wheel 47, a third meshing wheel 48, a transmission belt member 49, a connecting member 401, a plurality of first resilient members 402, a plurality of second resilient members 403, a first flat washer 404, a second flat washer 405, a first fastener 406, and a second fastener 407.

The first pivot shaft 41 includes a first shaft portion 411 and a first engaging portion 413 extending from one end of the first shaft portion 411. The first shaft portion 411 includes a first locking part 4111 of a non-circular cross-section and a first rotating part 4113 of a circular cross-section. The first rotating part 4113 of the first shaft portion 411 is positioned between the first locking part 4111 and the first engaging portion 413. In the illustrated embodiment, the first engaging portion 413 is a threaded portion.

The second pivot shaft 42 has the same structure as the first pivot shaft 41, and thus the second pivot shaft 42 includes a second shaft portion 421 and a second engaging portion 423. The second shaft portion 421 includes a second locking part 4211 of a non-circular cross-section and a second rotating part 4213 of a circular cross-section. The second rotating part 4213 of the second shaft portion 421 is positioned between the second locking part 4211 and the second engaging portion 423. In the illustrated embodiment, the second engaging portion 423 is also a threaded portion.

The third pivot shaft 43 includes a head portion 431 and an inserting portion 433. In the illustrated embodiment, the head portion 431 is a flange formed on an end of the inserting portion 433.

The first bracket 44 includes a first connecting plate 441 and a first pivotal plate 443. The first pivotal plate 443 bends from the first connecting plate 441 and defines a non-circular first axle hole 4431. In the illustrated embodiment, the first pivotal plate 443 is substantially perpendicular to the first connecting plate 441.

The second bracket 45 includes a second connecting plate 451 and a second pivotal plate 453. The second pivotal plate 453 bends from the second connecting plate 451 and defines a circular second axle hole 4531. In the illustrated embodiment, the second pivotal plate 453 is substantially perpendicular to the second connecting plate 451.

Each of the first meshing wheel 46, the second meshing wheel 47, and the third meshing wheel 48 defines a plurality of teeth (not labeled) on their peripheries thereof. The first meshing wheel 46 defines a first central hole 461, and the second meshing wheel 47 defines a second central hole 471. The first and second central holes 461, 471 are non-circular. The third meshing wheel 48 defines a third central hole 481 which is circular. In the illustrated embodiment, the first meshing wheel 46, the second meshing wheel 47, and the third meshing wheel 48 are gears.

The transmission belt member 49 is made of a flexible material. A width of the transmission belt member 49 is smaller than a thickness of the third meshing wheel 48. The transmission belt member 49 forms a plurality of teeth 491. In the illustrated embodiment, the transmission belt member 49 is a drive belt and made of plastic. The thickness of the third meshing wheel 48 is larger than or equal to the thickness of the second meshing wheel 47 and the width of the transmission belt member 49 combined.

The connecting member 401 includes a connecting portion 4011 and a fixing portion 4012. The connecting portion 4011 defines a first pivotal hole 4013, a second pivotal hole 4014, and a third pivotal hole 4015. The third pivotal hole 4015 is located between the first pivotal hole 4013 and the second pivotal hole 4014, and is adjacent to the second pivotal hole 4014. The connecting portion 4011 further forms a resisting protrusion 4016 around the first pivotal hole 4013. The fixing portion 4012 extends from one side of the connecting portion 4011. In the illustrated embodiment, the fixing portion 4012 bends from an edge of the connecting portion 4011.

The first resilient members 402 and the second resilient members 403 are disk-shaped spring washers, and they may be compression springs instead.

Each of the first flat washer 404 and the second flat washer 405 define a circular central hole.

In the illustrated embodiment, the first and second fasteners 406, 407 are a plurality of screw nuts threaded on the first and second pivot shaft 41, 42 respectively.

During assembly of the hinge assembly 40, the first shaft portion 411 of the first pivot shaft 41 passes through the first pivotal hole 4013 of the connecting member 401 and the first central hole 461 of the first meshing wheel 46, the second shaft portion 421 of the second pivot shaft 42 passes through the second pivotal hole 4014 of the connecting member 401 and the second central hole 471 of the second meshing wheel 47. The inserting portion 433 of the third pivot shaft 43 passes through the third pivotal hole 4015 of the connecting member 401 and the third central hole 481 of the third meshing wheel 48, thereby the third meshing wheel 48 meshes with the second meshing wheel 47. The first meshing wheel 46 is non-rotatably sleeved on the first locking part 4111 of the first pivot shaft 41, the second meshing wheel 47 is non-rotatably sleeved on the second locking part 4211 of the second pivot shaft 42, and the third meshing wheel 48 is rotatably sleeved on the inserting portion 433 of the third pivot shaft 43.

The head portion 431 resists on one side of the connecting portion 4011 of the connecting member 401 which is away from the resisting protrusion 4016. The transmission belt member 49 is sleeved on the first meshing wheel 46 and the third meshing wheel 48, and the transmission belt member 49 mesh with both of the first meshing wheel 46 and the third meshing wheel 48.

The first locking part 4111 of the first pivot shaft 41 passes through the first axle hole 4431 of the first bracket 44, and the second locking part 4211 of the second pivot shaft 42 passes through the second axle hole 4531 of the second bracket 45. The first bracket 44 and the second bracket 45 are non-rotatably sleeved on the first pivot shaft 41 and the second pivot shaft 42, respectively.

The first engaging portion 413 passes through the first resilient members 402 and the first flat washer 404, and engages with the first fastener 406. The second engaging portion 423 passes through the second resilient members 403 and the second flat washer 405, and engages with the second fastener 407 in the same manner. Accordingly, one hinge assembly 40 is assembled, and the other hinge assembly 40 is assembled in the same manner.

In the hinge assembly 40, the first pivot shaft 41, the second pivot shaft 42, and the third pivot shaft 43 are substantially parallel to one another. The connecting portion 4011 of the connecting member 401 is sleeved on the first rotating part 4113 of the first pivot shaft 41 and the second rotating part 4213 of the second pivot shaft 42, whereby the connecting member 401 is rotatably sleeved on the first pivot shaft 41 and the second pivot shaft 42. The connecting member 401 is non-rotatably sleeved on the third pivot shaft 43; and the third meshing wheel 48 rotates synchronously with the third pivot shaft 43. One end of the first meshing wheel 46 resists the resisting protrusion 4016 of the connecting member 401, and the other end resists the first bracket 44. One end of the second meshing wheel 47 resists the connecting member 401, and the other end resists one end of the transmission belt member 49.

Also referring to FIGS. 1 and 2, during in assembly of the electronic device 100, one hinge assembly 40 is partially received in the connecting arm 30 from one end of the connecting arm 30 and the fixing portion 4012 of the connecting member 401 is locked with the connecting arm 30 by a plurality of fasteners (not shown). The first bracket 44 and the second bracket 45 of the hinge assembly 40 are exposed beyond the connecting arm 30. The other hinge assembly 40 is assembled to the other end of the connecting arm 30 in the same manner. The first connecting plates 441 of the first brackets 44 of two of the hinge assemblies 40 are fixed to the first connecting protrusions 11 of the first main body 10; and the second connecting plates 451 of the second brackets 45 of the two hinge assemblies 40 are fixed to the second connecting protrusions 21 of the second main body 20. Accordingly, the electronic device 100 is assembled.

In use, when a rotating force is applied on the first main body 10, the first main body 10 with the first bracket 44 of each hinge assembly 40 drives the first pivot shaft 41 to rotate in the same direction. When the first pivot shaft 41 rotates, the first meshing wheel 46 rotates synchronously. During the rotation of the first meshing wheel 46, some of the teeth of the first meshing wheel 46 mesh with the transmission belt member 49, and some of the teeth of the first meshing wheel 46 disengage from the transmission belt member 49, such that the transmission belt member 49 rotates together with the first meshing wheel 46. The third meshing wheel 48 is driven by the transmission belt member 49 to rotate together with the transmission belt member 49. During the rotation of the third meshing wheel 48, different teeth of the second meshing wheel 47 mesh with the third meshing wheel 48, whereby the second meshing wheel 47 is rotated by the third meshing wheel 48 in a reverse direction relative to the rotation direction of the third meshing wheel 48. Furthermore, the second meshing wheel 47 rotates the second pivot shaft 42 and the second bracket 45 together in the same direction as the second meshing wheel 47. Moreover, the second main body 20 rotates together with the second bracket 45.

Since the third meshing wheel 48 rotates in the same direction as the first main body 10, and the second meshing wheel 47 rotates in the same direction with the second main body 20, whereas the third meshing wheel 48 and the second meshing wheel 47 rotate in reverse directions, the first main body 10 and the second main body 20 rotate in reverse directions relative to each other to open or close.

In the electronic device 100, both of the first main body 10 and the second main body 20 rotate when a rotating force is applied on either the first main body 10 or the second main body 20. Thereby, the electronic device 100 is capable of being opened or closed faster at double-speed. Furthermore, lesser force needs to be applied on the electronic device 100 to open or close.

In the electronic device 100, only one meshing wheel, that is the third meshing wheel 48, meshes with other elements on both sides, furthermore, the transmission belt member 49 is a belt which is capable of allowing an acceptable amount of deformation within tolerance range, such that the hinge assembly 40 cannot choke during rotating.

The transmission belt member 49 is made of flexible material, such as the plastic, therefore, the hinge assembly 40 is capable of rotating smoothly, with little noise and of good handling.

The resisting protrusion 4016 of the connecting member 401 ensures that the first meshing wheel 46 cannot move along the first pivot shaft 41 between the first bracket 44 and the connecting portion 4011 of the connecting member 401. Thereby, the first meshing wheel 46 meshes with the transmission belt member 49 stably.

In alternative embodiments, the connecting arm 30 of the electronic device 100 may be omitted, instead, the first bracket 44 and the second bracket 45 of each of the hinge assembly 40 is fixed to the first main body 10 and the second main body 20, respectively. The fixing portion 4012 of the connecting member 401 may be omitted correspondingly. The third pivot shaft 43 may have a non-circular cross-section and the third meshing wheel 48 defines a non-circular central hole correspondingly, furthermore, the connecting member 401 is rotatably sleeved on the third pivot shaft 43, such that the third pivot shaft 43 and the third meshing wheel 48 are capable of rotating relative to the connecting member 401. The number of hinge assemblies 40 may be one, three or more.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a first pivot shaft;
   a second pivot shaft substantially parallel to the first pivot shaft;
   a first bracket non-rotatably sleeved on the first pivot shaft;
   a second bracket non-rotatably sleeved on the second pivot shaft;
   a first meshing wheel capable of synchronously rotating with the first pivot shaft;
   a second meshing wheel capable of synchronously rotating with the second pivot shaft;
   a third meshing wheel between the first meshing wheel and the second meshing wheel, and the third meshing wheel meshing with the second meshing wheel;
   a transmission belt member sleeved on and meshing with the first meshing wheel and the third meshing wheel; and
   a connecting member rotatably sleeved on the first pivot shaft and the second pivot shaft.

2. The hinge assembly of claim 1, wherein the connecting member comprises a connecting portion and a fixing portion, and the connecting portion is sleeved on the first pivot shaft and the second pivot shaft, and the fixing portion extends from the connecting portion.

3. The hinge assembly of claim 2, further comprising a third pivot shaft substantially parallel to the first pivot shaft, wherein the connecting portion of the connecting member is non-rotatably sleeved on the third pivot shaft, and the third meshing wheel synchronously rotates with the third pivot shaft.

4. The hinge assembly of claim 2, wherein the connecting portion of the connecting member forms a resisting protrusion resisting the first meshing wheel.

5. The hinge assembly of claim 1, wherein the first meshing wheel, the second meshing wheel, and the third meshing wheel are gears, and the transmission belt member is a drive belt comprising a plurality of teeth.

6. A hinge assembly, comprising:
   a first pivot shaft;
   a second pivot shaft substantially parallel to the first pivot shaft;
   a first bracket non-rotatably sleeved on the first pivot shaft;
   a second bracket non-rotatably sleeved on the second pivot shaft;
   a first meshing wheel capable of synchronously rotating with the first pivot shaft;
   a second meshing wheel capable of synchronously rotating with the second pivot shaft;
   a third meshing wheel between the first meshing wheel and the second meshing wheel;
   a transmission belt member; and
   a connecting member rotatably sleeved on the first pivot shaft and the second pivot shaft;
   wherein the first bracket is capable of driving the first meshing wheel to rotate, the first meshing wheel is capable of driving the third meshing wheel to rotate by means of the transmission belt member, and the third meshing wheel is capable of driving the second meshing wheel to rotate.

7. The hinge assembly of claim 6, wherein the connecting member comprises a connecting portion and a fixing portion, and the connecting portion is sleeved on the first pivot shaft and the second pivot shaft.

8. The hinge assembly of claim 7, further comprising a third pivot shaft, wherein the third pivot shaft passes through the connecting portion of the connecting member, and the third meshing wheel is sleeved on the third pivot shaft.

9. The hinge assembly of claim 6, wherein the transmission belt member sleeves on and meshes with the first meshing wheel and the third meshing wheel, and the third meshing wheel meshes with the transmission belt member and the second meshing wheel.

10. The hinge assembly of claim 6, wherein the transmission belt member is made of a flexible material.

11. An electronic device, comprising:
    a first main body;
    a second main body;
    a connecting arm; and
    at least one hinge assembly connecting the first main body and the second main body, and the hinge assembly comprising:
    a first pivot shaft;
    a second pivot shaft substantially parallel to the first pivot shaft;
    a first bracket non-rotatably sleeved on the first pivot shaft;
    a second bracket non-rotatably sleeved on the second pivot shaft;
    a first meshing wheel capable of synchronously rotating with the first pivot shaft;
    a second meshing wheel capable of synchronously rotating with the second pivot shaft;

a third meshing wheel between the first meshing wheel and the second meshing wheel, and the third meshing wheel meshing with the second meshing wheel;

a transmission belt member sleeved on and meshing with the first meshing wheel and the third meshing wheel; and a connecting member comprising a connecting portion and a fixing portion, the connecting portion rotatably sleeved on the first pivot shaft and the second pivot shaft, and the fixing portion fixed to the connecting arm;

wherein the first bracket of the hinge assembly is fixed to the first main body, and the second bracket of the hinge assembly is fixed to the second main body.

12. The electronic device of claim 11, wherein the first main body forms at least one first connecting protrusion and the second main body forms at least one second connecting protrusion of equal number, the first bracket of the hinge assembly is fixed to the first connecting protrusion, and the second bracket is fixed to the second connecting protrusion.

13. The electronic device of claim 11, wherein the hinge assembly further comprises a third pivot shaft parallel to the first pivot shaft, the connecting portion of the connecting member is non-rotatably sleeved on the third pivot shaft, and the third meshing wheel synchronously rotates with the third pivot shaft.

14. The electronic device of claim 11, wherein the connecting portion of the connecting member of the hinge assembly forms a resisting protrusion resisting the first meshing wheel.

15. The electronic device of claim 11, wherein the first meshing wheel, the second meshing wheel, and the third meshing wheel are gears, and the transmission belt member is a drive belt comprising a plurality of teeth.

16. The electronic device of claim 11, wherein the transmission belt member is made of a flexible material.

* * * * *